(12) United States Patent
Varineau et al.

(10) Patent No.: US 7,906,474 B2
(45) Date of Patent: Mar. 15, 2011

(54) ALKOXYLATE BLEND SURFACTANTS

(75) Inventors: Pierre T. Varineau, Lake Jackson, TX (US); Kara S. Weber, Lake Jackson, TX (US); Kirk R. Thompson, Lake Jackson, TX (US); Aaron W. Sanders, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 58 days.

(21) Appl. No.: 12/521,827

(22) PCT Filed: Dec. 19, 2007

(86) PCT No.: PCT/US2007/088023
§ 371 (c)(1),
(2), (4) Date: Jun. 30, 2009

(87) PCT Pub. No.: WO2008/088647
PCT Pub. Date: Jul. 24, 2008

(65) Prior Publication Data
US 2010/0081607 A1    Apr. 1, 2010

Related U.S. Application Data

(60) Provisional application No. 60/879,876, filed on Jan. 11, 2007.

(51) Int. Cl.
*C11D 1/722* (2006.01)
(52) U.S. Cl. ......... 510/421; 510/360; 510/475; 510/505; 510/524; 510/535
(58) Field of Classification Search ............... 510/360, 510/421, 475, 505, 524, 535
See application file for complete search history.

(56) References Cited

U.S. PATENT DOCUMENTS

| | | |
|---|---|---|
| 2,174,761 A | 10/1939 | Schuette et al. |
| 2,677,700 A | 5/1954 | Jackson et al. |
| 3,963,628 A | 6/1976 | Park |
| 3,983,078 A | 9/1976 | Collins |
| 4,019,990 A | 4/1977 | Marshall et al. |
| 4,111,818 A | 9/1978 | Postman et al. |
| 4,280,919 A | 7/1981 | Stoeckigt et al. |
| 4,340,382 A | 7/1982 | Morlino et al. |
| 4,343,616 A | 8/1982 | Decker et al. |
| 4,410,447 A | 10/1983 | Decker et al. |
| 4,438,014 A | 3/1984 | Scott |
| 4,608,189 A | 8/1986 | Koch et al. |
| 4,784,798 A | 11/1988 | Geke et al. |
| 4,832,868 A | 5/1989 | Schmid et al. |
| 4,965,014 A * | 10/1990 | Jeschke et al. ............... 510/376 |
| 4,968,450 A | 11/1990 | Kamegai et al. |
| 5,364,552 A | 11/1994 | Merz et al. |
| 5,516,451 A | 5/1996 | Schmitt et al. |
| 5,536,884 A | 7/1996 | Stoeckigt et al. |
| 5,559,091 A | 9/1996 | Geboes et al. |
| 5,705,476 A | 1/1998 | Hoffarth |
| 5,767,056 A | 6/1998 | Lenoir |
| 5,849,960 A | 12/1998 | Singleton et al. |
| 6,001,790 A | 12/1999 | Schmitt et al. |
| 6,429,342 B1 | 8/2002 | Clement et al. |
| 2005/0170991 A1 | 8/2005 | Ruland et al. |

FOREIGN PATENT DOCUMENTS

| | | |
|---|---|---|
| CA | 2072009 | 6/1991 |
| CA | 2483470 | 11/2003 |
| EP | 0034194 | 8/1981 |
| EP | 0652281 | 9/1999 |
| GB | 1601652 | 11/1981 |
| GB | 2145726 | 4/1985 |
| GB | 2194536 | 3/1988 |
| WO | 94/10278 | 5/1994 |
| WO | 2004/005230 | 1/2004 |

* cited by examiner

*Primary Examiner* — Brian P Mruk

(57) ABSTRACT

Surfactant compositions that include one or more nonionic surfactants derived from seed oils and having a mixture of at least 8, 10 and 12 carbon atom linear alkyl moieties find use in a number of end use applications as substitutes for petroleum derived surfactants.

13 Claims, No Drawings

ALKOXYLATE BLEND SURFACTANTS

CROSS REFERENCE TO RELATED APPLICATIONS

This is a §371 application of PCT International Patent Application Number PCT/US2007/088023 filed Dec. 19, 2007, and claims priority from provisional application Ser. No. 60/879,876 filed Jan. 11, 2007, each of which is incorporated herein by reference in its entirety.

FIELD OF THE INVENTION

This invention relates to surfactant compositions comprising blends of alkoxylated alcohols and their use in detergents, hard surface cleaners, foam flotation agents, and emulsifiers.

BACKGROUND OF THE INVENTION

A recent trend promotes production of ultra-concentrated formulations or systems that contain little or no water. Such formulations or concentrates are delivered to an end-use customer who then dilutes the concentrate with water to produce a final working solution. Those who use concentrates consider it an eco-friendly approach as it eliminates costs associated with shipping water and reduces material requirements for packaging. The concentrates typically include one or more nonionic surfactants because they are compatible with all other surfactant types (e.g. anionic, cationic and zwitterionic surfactants). In addition, nonionic surfactants resist precipitation with hard water and offer excellent oil grease cleaning benefits.

Household and industrial applications that employ ultra-concentrates include laundry detergents, hard surface cleaners, automatic dishwasher detergents, rinse aids, emulsification packages (such as agricultural-emulsifiers), and flotation systems (for applications such as paper de-inking and ore flotation).

Soap and detergent manufacturers use the term "diluted" to refer both to dissolution of solids and reduction of concentration of liquids. For example, liquid laundry detergent may be diluted in a tub of water. Similarly, a powdered or block laundry detergent that is dissolved in a tub of water also would be referred to as "diluted."

A common problem for concentrated formulas that contain surfactants is formation of gels when a solid or liquid surfactant is diluted with water. For example, a formulation or concentrate consisting primarily of a 9-mole ethoxylate of nonylphenol (such as Tergitol™ NP-9) forms resilient, slow-dissolving gels when mixed with water. For end-use customers (especially household customers), these slow-dissolving gels require extensive mixing which can interfere with convenience and effectiveness of end-use or diluted formulations. One way the industry expresses a tendency of a surfactant to cause gels is a "gel range." A typical gel range describes a percentage of samples that form gels, out of a number of samples, each having increasing surfactant concentration. For example, a gel range of less than 20% indicates that less than two samples out of nine samples form gels; the nine samples having surfactant concentrations of 10 wt. %, 20 wt. %, 30 wt. %, 40 wt. %, 50 wt. %, 60 wt. %, 70 wt. %, 80 wt. %, and 90 wt. %, each weight percentage (wt %) being based upon combined weight of surfactant and de-ionized water. A sample forms a gel when it is non-pourable for at least five seconds at 23° centigrade (° C.) when its container is inverted 180° so the container's open spout or mouth faces down. For many applications, a surfactant ideally has no gel range. In other words, it does not form gels when mixed with water.

In some cases, the tendency to form gels can be overcome by adding an anti-gelling agent such as a solvent or a polyglycol to the formulation. For example, a simple formulation containing 20 wt % of a 9-mole ethoxylate of nonylphenol (Tergitol™ NP-9) and 80 wt % propylene glycol (each wt % based on formulation weight) will not form gels upon dilution with water. However, the addition of anti-gelling agents tends to increase overall complexity and cost of the formulation, and therefore may be undesirable.

In addition to gel formation tendency, an important physical property consideration for use in selecting a surfactant is its tendency to undergo a viscosity increase as temperatures fall or decrease. Surfactant users typically select "pour point" or "pour point temperature" as a general indicator of handling characteristics of a pure surfactant under reduced temperatures. They consider pour point as that temperature below which a liquid surfactant will fail to pour from a container.

Many nonionic surfactants are alkoxylates of fatty alcohols containing greater than about eight carbons ($C_{8+}$). The alkoxylates are typically block or random polymers of ethoxy, propoxy, butoxy, or even larger alkoxy groups. These alkoxylates vary in alkyl group size, usually represented by "R", and in number of alkoxy groups in a polymer chain, also referred to as "degree of alkoxylation". The number and size of alkoxylate groups affects surfactant performance attributes including dispersibility and stability in various solutions, detergency, foam formation, and cleaning performance.

In recent years, the global chemical industry has expressed increasing interest in using renewable resources, such as plant or seed oils, to reduce dependence on petroleum and natural gas feedstocks. Seed oils contain fatty acids that may be converted to alcohols using known technology. The alcohols, in turn, may be converted to alcohol alkoxylates by methods such as those discussed in "Nonionic Surfactants", Martin, J. Schick, Editor, 1967, Marcel Dekker, Inc., or United States Patent Application Publication (USPAP) 2005/0170991A1. Fatty acid alcohols may also be alkoxylated using metal cyanide catalysts including (but not limited to) those described in U.S. Pat. No. 6,429,342.

Alcohols derived from natural feedstocks tend to have carbon chains that are more linear, and less branched, than alcohols derived from petroleum and natural gas products, which may be regarded as semi-linear or branched. In addition, when produced via hydrogenation of fatty acids, alcohols tend to be primary alcohols, having only one reactive group and an even number of carbon atoms in each chain or molecule. When alkoxylated, natural feedstock-derived alcohols produce surfactants that may behave somewhat differently than their petroleum and natural gas analogs. For example, alkoxylates with a generally linear structure tend to self-associate and form gels to a greater extent in water than those with a semi-linear or branched structure. As such, surfactants based upon alkoxylated, natural oil-derived alcohols often do not function as drop in replacements for surfactants based upon alkoxylated alcohols derived from petroleum and natural gas feedstocks. As they are not drop in replacements, formulators must accommodate differences between surfactants based on natural oils and surfactants based upon petroleum or natural gas in preparing formulations for various uses.

Relatively short-chain alkoxylates of linear alcohols derived from petroleum or natural gas, i.e. those where R contains from 6 to 10 carbon atoms ($C_{6-10}$ or $C_6$-$C_{10}$), typically do not form gels, and are often used in applications to avoid gel formation. For example, Triton™ XL-80N, based on an alkoxylate of a $C_8$-$C_{10}$ blend of alcohols, exhibits a narrow gel range (less than 20% of the range from 0% to 100% dilution) and is often used in hard-surface formulations that require rapid dissolution in the absence of gels. Other short-chain alkoxylates that have no gel range include Plurafac™ SLF-62 (based on a $C_{6-10}$ alkoxylate blend), Alfonic™ 810-60 (a $C_8$-$C_{10}$ ethoxylate), and Surfonic™ JL-80X (a $C_{8-10}$ alkoxylate)

Although these relatively short-chain alkoxylates of linear alcohols form few, if any, gels upon dilution with water, they perform poorly in some applications. For example, the $C_8$-$C_{10}$ alkoxylates of linear alcohols do not perform well in some standard laundry cleaning tests. Conversely, formulations with relatively long-chain alkoxylates of linear alcohols derived from petroleum or natural gas, e.g. $C_{11-16}$ alcohol ethoxylates, have better detergent performance than the $C_8$-$C_{10}$ alkoxylates of linear alcohols, but tend to form more gels. Gel formation is even more of a problem for $C_{12-18}$ seed-oil based alcohol ethoxylates, since these materials are 100% linear and form gels that are very difficult to dissolve in water.

One approach to improve general properties such as detergency, oil removal, or metal cleaning is to use blends of two or more nonionic surfactants. However, blends of alkoxylates, especially $C_{10-16}$ alcohol alkoxylates, to give surfactants with specific properties (e.g. a certain pour point, a low or reduced gel range, and a desired detergency) when used in an ultra-concentrated formulas appear to be unknown.

U.S. Pat. No. 3,983,078 teaches the use of mixtures of long-chain alkylene oxide surfactants and short-chain alkylene oxide co-surfactants. The mixtures have a hydrophilic-lipophilic balance (HLB) in a range of from about 10.8 to 12.0. These surfactants blends are claimed as one part of complex formulations or blends that incorporate builders (sodium tripolyphosphate), hydrotropes (sodium toluene sulfonate), thickeners (sodium carboxymethyl cellulose), and other additives. In this case, "long-chain" refers to a formula: $R—O—(C_yH_{2y}O)_a—(C_zH_{2z}O)_b—C_wH_{2w}OH$, where R ranges from $C_{8-15}$, a=0-11; b=0-11; a+b=4-11; y=2-3; z=2-3; w=2-3; and "short chain" encompasses a formula $R_1—O—(C_2H_4)_x—C_2H_4OH$, where $R_1=C_{8-11}$ and x=3.5-5. Illustrative mixtures include 60-80 wt % of the "long chain" component" and 20-40 wt % of the "short-chain" component, the weight percentages being based upon mixture weight and totaling 100 wt %.

U.S. Pat. No. 4,965,014 describes liquid nonionic surfactant mixtures having a general formula $R—O—(PO)_{1-2}(EO)_{6-8}(H)$ where PO refers to propylene oxide, EO refers to ethylene oxide, O represents oxygen and H represents hydrogen. The mixtures have components with R selected so that $C_8$=0 to 5%, $C_{9-10}$=75-90%, $C_{11-12}$=5-15%, $C_{13-14}$=4-10%, $C_{15-16}$=0 to 3%.

Patent Cooperation Treaty Publication (WO) 94/10278 describes blends of surfactants based on a mixture of component A with component B in weight ratios ranging from 4:1 to 10:1 (80 wt % to 91 wt % component A). Component A is defined as $R^1—(OC_3H_6)n-(OC_2H_4)p-OH$, in which $R^1$ is an alkyl residue with 6 to 10 carbon atoms, n is a number from 0.5 to 8, p is a number from 4 to 10. Component B is defined as $R^2—(OC_2H_4)_q—OH$, in which $R^2$ is an alkyl residue with 10 to 22 carbon atoms and q is a number from 4 to 10. The example teaches a blend of 85% of a $C_8$ alkoxylate with 15% of a $C_{12-14}$ ethoxylate.

SUMMARY OF INVENTION

One aspect of this invention is a surfactant composition comprising at least one nonionic surfactant represented by Formula (I)

$$R—O—(C_3H_6O)_x(C_2H_4O)_y—H \qquad (I)$$

wherein x is a real number within a range of from 0.5 to 3, y is a real number within a range of from 2 to 10, and R is a mixture of seed-oil based linear alkyl moieties with an alkyl moiety distribution as follows wherein each wt % is based upon weight of all alkyl moieties present in the distribution and all wt % for each distribution total 100 wt %:

| Carbon Atoms in Moiety | Amount |
|---|---|
| $C_6$ | 0 wt %-40 wt % |
| $C_8$ | 20 wt %-40 wt % |
| $C_{10}$ | 20 wt %-45 wt % |
| $C_{12}$ | 10 wt %-45 wt % |
| $C_{14}$ | 0 wt %-40 wt % |
| $C_{16}$-$C_{18}$ | 0 wt %-15 wt % |

The surfactant compositions of the present invention preferably combine detergency or cleaning performance typical of $C_{11}$-$C_{16}$ branched or semi-branched alkyl alkoxylates derived from petroleum with gel ranges and, more preferably, pour points and, still more preferably, dissolution in water characteristics, typical of $C_6$-$C_{10}$ branched or semi-branched alkyl alkoxylates derived from petroleum.

The surfactant compositions of the present invention exhibit at least one, preferably more than one, and still more preferably all of several physical or performance properties. The properties are: a) a gel range of less than 20% when mixed with water; b) a pour point of less than 10° C., c) detergency for laundry; d) dynamic surface wetting and textile wetting similar to Tergitol NP-9 Surfactant; e) biodegradability as defined by European Detergent Directive (OECD 301 test); f) desirable foam properties based on Ross-Miles Foam test (initial foam >100 mm, 5 min foam <50 mm); g) dissolution time in water of less than 2 minutes; h) wetting times of less than 50 seconds at a surfactant in water concentration of 0.05 wt %, based on total weight of surfactant and water and i) a critical micelle concentration less than 500 ppm.

The surfactant compositions of this invention find utility in ultra-concentrates, especially those used in applications such as laundry, hard surface cleaning, emulsification, and foam flotation processes. In particular, the surfactant compositions of this invention may replace conventional, petroleum-derived nonylphenol ethoxylates, alcohol ethoxylates or alcohol alkoxylates in many applications including (but not limited to) laundry detergents, hard surface cleaning agents, paints, coatings, flotation processing, emulsification, general wetting, adjuvants for agricultural chemicals, textile cleaning, textile processing, pulp processing, paper processing, mining, polyurethane foam processing, personal care, and oil field recovery.

As detailed below, surfactant compositions of this invention comprise alkoxylates having at least three different length alkyl groups, with a preferred subset including at least four different length alkyl groups. The surfactant compositions of this invention have improved detergency, dissolution and handling properties relative to surfactant compositions having the same number of carbon atoms in alkyl groups, but derived from petroleum or natural gas. The surfactant compositions of the present invention have particular utility in an ultra-concentrate formulation where they constitute from 2 wt % to 90 wt % of the formulation, based upon total formulation weight. The surfactant compositions of the present invention allow one to minimize, preferably eliminate, use of anti-gelling agents, such as solvents or polyglycols, in formulating such ultra-concentrates.

DESCRIPTION OF THE INVENTION

Each occurrence of a range in this application includes both endpoints that establish the range unless otherwise stated. In other words, a range of from 2 to 10 necessarily includes both 2 and 10 unless otherwise stated.

The surfactant compositions of the present invention comprise at least one, preferably more than one, nonionic surfactant represented by Formula (I)

$$R—O—(C_3H_6O)_x(C_2H_4O)_y—H \quad (I)$$

In Formula (I), each $C_3H_6O$ moiety may also be called a poly(oxypropylene) or PO moiety and each $C_2H_4O$ moiety may also be called a poly(oxyethylene) or EO moiety. In addition, x is a real number within a range of from 0.5 to 3 and y is a real number within a range of from 2 to 10. Finally, R represents a mixture of linear alkyl moieties, most preferably a mixture of linear alkyl moieties that are alkoxylates of seed oil-derived alcohols. Even more preferably, R has an alkyl moiety distribution in accord with ranges shown in Table I below.

TABLE 1

Percentages of alkyl moieties

| Alkyl Moiety Carbon Chain Length | Weight Percent |
|---|---|
| $C_6$ | 0-40 |
| $C_8$ | 20-40 |
| $C_{10}$ | 20-45 |
| $C_{12}$ | 10-45 |
| $C_{14}$ | 0-40 |
| $C_{16}$ | 0-15 |

As shown in Table 1, R can be a mixture of just three alkyl moieties, $C_8$, $C_{10}$ and $C_{12}$. Any one or more of $C_6$, $C_{14}$ and $C_{16}$ alkyl moieties may, but need not be, present in surfactant compositions of the present invention. When present, the amounts of $C_6$, $C_{14}$ and $C_{16}$ alkyl moieties may satisfy any of their respective ranges as shown in Table 1 as long as all weight percentages total 100 wt %.

The surfactants of the present invention, sometimes generically referred to as alkoxylates, are preferably prepared in a sequential manner that includes propoxylation (adding PO or poly(oxypropylene)) moieties of an alcohol or mixture of alcohols to form a PO block followed by ethoxylation (adding EO or poly(oxyethylene)) moieties to form an EO block attached to the PO block, but spaced apart from R which represents alkyl moieties from the alcohol or mixture of alcohols. One may either begin with a mixture of alcohols that provides a distribution of alkyl moieties and then sequentially propoxylate and ethoxylate the mixture or separately propoxylate and ethoxylate select alcohols and then combine such alkoxylates (propoxylated and ethoxylated alcohols) in proportions sufficient to provide a distribution as shown in Table 1 above.

Formula (I) above includes variables "x" and "y" that, taken together, establish a degree of alkoxylation in an oligomer distribution. Individually, "x" and "y" represent average degrees of, respectively, propoxylation and ethoxylation. The degree of propoxylation or "x" preferably falls within a range of from 0.5 to less than 4, more preferably within a range of from 0.5 to 3, still more preferably within a range of from 2 to 3, and even more preferably within a range of from 2.5 to 3. The degree of ethoxylation or "y" preferably falls within a range of from 2 to 10, more preferably within a range of from 2 to 8, still more preferably within a range of from 4 to 8 and even more preferably within a range of from 6 to 8.

As a general rule in selecting degrees of propoxylation and ethoxylation, note that as propoxylation of a conventional $C_8$ surfactant derived from petroleum increases so does detergency of the surfactant, but a tradeoff occurs in that propoxylation or an "x" value in excess of about 3 typically leads to a decrease in biodegradability.

A preferred subset of surfactant compositions of the present invention as represented by Formula (I) include x being within a range of from 2.5 to 3, y remaining within a range of from 2 to 10 and R has an alkyl moiety distribution as shown in Table 2 below.

TABLE 2

Percentages of alkyl moieties

| Alkyl Moiety Carbon Chain Length | Weight Percent |
|---|---|
| $C_6$ | 0-36 |
| $C_8$ | 22-40 |
| $C_{10}$ | 27-44 |
| $C_{12}$ | 14-35 |
| $C_{14}$ | 5-13 |
| $C_{16}$ | 0-5 |

In other words, the surfactant compositions as shown in Table 2 must include a mixture of at least four alkyl moieties, $C_8$, $C_{10}$, $C_{12}$ and $C_{14}$. Either or both of $C_6$, and $C_{16}$ alkyl moieties may, but need not be, present in surfactant compositions of this preferred subset of the present invention. When present, the amounts of $C_6$ and $C_{16}$ alkyl moieties may satisfy any of their respective ranges as shown in Table 1 as long as all weight percentages total 100 wt %.

The following examples illustrate, but do not limit, the present invention. All parts and percentages are based upon weight, unless otherwise stated. All temperatures are in ° C. Examples (Ex) of the present invention are designated by Arabic numerals and Comparative Examples (Comp Ex) are designated by capital alphabetic letters.

Comp Ex A

Preparation of $C_{8-10}O(PO)_3(EO)_{5.5}H$

Combine equal weights (1000 gram (g) each) of 1-octanol (99%) (Aldrich Cat 47232-8) (CAS# 111-87-5) and 1-decanol (decyl alcohol) Aldrich Cat# 12-058-4 (CAS# 112-30-1) to form an alcohol blend. Add 3 g of flaked potassium hydroxide (KOH) to 1000 g of the alcohol blend to form a catalyzed mixture. Distill the catalyzed mixture under a partial vacuum (50 millimeters of mercury (mm Hg)) with a nitrogen purge for 45 minutes and a temperature of 100° C., or until catalyzed mixture has a water content of less than 500 parts by weight per million parts by weight of catalyzed mixture (ppm).

Add 1210 g of propylene oxide (PO) to the distilled, catalyzed mixture with stifring to provide a first combined mixture and heat the first combined mixture to a temperature of 130° C. With continued stirring, maintain the first combined mixture at a temperature of 130° C. for four hours to allow propoxylation to proceed substantially to completion and yield a propoxylated intermediate.

With continued stirring and maintenance of the 130° C. temperature, add 1685 g of ethylene oxide to the propoxylated intermediate to provide a second combined mixture. Maintain stirring and the 130° C. temperature through addition of 1685 g of ethylene oxide (EO) and for a period of two hours thereafter to allow ethoxylation to proceed substantially to completion as evidenced by a residual EO content of less than 10 ppm, based upon weight of the second combined mixture, and yield a raw product.

Cool the raw product to a temperature of 70° C. then add neutralize with 2.4 g of acetic acid to yield a propoxylated and ethoxylated surfactant. The surfactant has a final cloud point, measured as a 1 wt % aqueous solution, in accord with American Society for Testing and Materials (ASTM) D2024 of 46.3° C.

Comp Ex B

Preparation of $C_{12-C14}O(PO)_2(EO)_7H$

Combine equal weights (1000 grams each) of 1-dodecanol (98%) (Aldrich 44381-6) (CAS# 112-53-8) with 1-Tetradecanol (Aldrich T-960-5) (CAS # 112-72-1) to form a blend of $C_{12}$ and $C_{14}$ alcohols. Add 2 g of flaked KOH to 900 g of blend to form a catalyzed mixture as in Ex 1.

Replicate Ex 1 with changes to first propoxylate with 540 g of PO, then ethoxylate with 1540 g of EO and neutralize with 1.5 g of acetic acid. The resulting propoxylated and ethoxylated surfactant has a final cloud point of 51° C.

Ex 1

Preparation of $C_{6-16}$ Alkoxylate Using Pre-Blended Alcohols

Combine 500 g of a seed-oil derived $C_{8-10}$ alcohol, with a hydroxyl number of approximately 386 (corresponding to a blend consisting of about 55% n-decanol and about 45% n-octanol) with 500 g of a seed-oil derived $C_{12-16}$ blend having a hydroxyl value of approximately 288 (corresponding to a blend consisting of about 70% n-dodecanol, 25% n-tetradecanol and 5% n-hexadecanol) to provide a mixed alcohol stream. The mixed alcohol stream provides an alkyl moiety weight percentage distribution as follows: $C_8$=22.5%, $C_{10}$=27.5%, $C_{12}$=35%, $C_{14}$=12.5 and $C_{16}$=2.5%.

Add 3 g of flaked KOH to the mixed alcohol stream to form a catalyzed mixture as in Ex 1. Distill 633.57 g of the catalyzed mixture as in Ex 1, but reduce time at temperature from 45 minutes to 10 minutes. Replicate Ex 1 with changes to first propoxylate with 540 g of PO, then ethoxylate with 820 g of EO the distilled, catalyzed mixture. Effect raw product neutralization with 2.2 g of acetic acid.

The propoxylated and ethoxylated surfactant has a final cloud point of 34.4° C. and a structure (based on raw material feeds) of $C_{8-16}O(PO)_{2.5}(EO)_5H$.

Comp Ex C $C_{8-10}O(PO)_{2.5}(EO)_{6.5}H$

Replicate Ex 1 with changes to convert 1035 g of a seed-oil derived $C_{8-10}$ alcohol to a propoxylated and ethoxylated surfactant. The alcohol has a hydroxyl number of approximately 386 (corresponding to a blend consisting of about 55% n-decanol and about 45% n-octanol). The changes include distillation for 30 minutes at 5 mm Hg rather than 45 minutes at 50 mm Hg as in Comp Ex A to attain a water content of less than 200 ppm. The changes also include 1050 g of PO, 1590 g of EO, addition of EO before propoxylation proceeds to a point where residual or unreacted PO reaches a level of less than 50 ppm and an increase in amount of acetic acid to 2.7 g.

The propoxylated and ethoxylated surfactant has a final cloud point of 51.2° C. and a structure (based on raw material feeds) of $C_{8-10}O(PO)_{2.5}(EO)_{6.5}H$.

Comp Ex D $C_{12-14}O(PO)_{2.5}(EO)_8H$

Replicate Comp Ex C with changes to prepare a propoxylated and ethoxylated surfactant from 998 g of a seed-oil derived $C_{12-16}$ blend with a hydroxyl value of approximately 288 (corresponding to a blend consisting of about 70% n-dodecanol, 25% n-tetradecanol and 5% n-hexadecanol). The changes include reducing distillation time to 15 minutes, propoxylation with 750 g of PO, ethoxylation with 1815 g of EO and neutralization with 2.6 g of acetic acid.

The propoxylated and ethoxylated surfactant has a final cloud point of 54.5° C. and a structure (based on raw material feeds) of $C_{12-14}O(PO)_{2.5}(EO)_8H$.

Comp Ex E

A 50:50 blend of Comp Ex A ($C_{8-10}O(PO)_3(EO)_{5.5}H$) and Comp Ex B ($C_{12}$-$C_{14}O(PO)_2(EO)_7H$)

Produce a simple mixture of two separately prepared surfactants by mixing 100 g of the surfactant of Comp Ex A with 100 g of the surfactant of Comp Ex B.

Ex 2

A 65:35 Blend of Comp Ex C($C_{8-10}O(PO)_{2.5}(EO)_{5.8}H$) and Comp Ex D ($C_{12}$-$C_{14}O(PO)_{2.5}(EO)_8H$)

Replicate Comp Ex E using 130 g of the surfactant of Comp Ex C and 70 g of the surfactant blend of Comp Ex D. The resulting blend of seed-oil based surfactants has an R group distribution as follows: $C_8$=28.09 wt %, $C_1(O)$=34.34 wt %; $C_{12}$=26.30 wt %; $C_{14}$=9.39 wt % and $C_{16}$=1.88 wt %, each wt % being based upon total distribution weight.

Example 3

Application Testing

Draves Wetting Test American Association of Textile Chemists and Colorists (AATCC) Test 17 (ASTM D2281)—Prepare 0.05 wt %, 0.10 wt % and 0.15 wt % solutions of surfactant in deionized water. Place a cotton skein (40/2 combed peeler yarn from Testfabrics, Inc.) in each solution and measure elapsed time until the skein collapses. In addition, calculate a concentration of surfactant required for wetting in 20 seconds based on a linear regression of a log time versus log concentration plot built on data from the 0.05 wt %, 0.10 wt % and 0.15 wt % solution testing Ross-Miles Foam Height Test—ASTM D1173

Surface Tension and Critical Micelle Concentration (CMC) Measurement Measure surface tension (dyne/centimeter (dyne/cm) using a Wilhelmy plate) of a surfactant-water solution while incrementally adding surfactant to de-ionized water, and plot test results versus surfactant concentration. The Critical Micelle Concentration is the point at which an increase in surfactant concentration no longer results in a change surface tension.

Pour Point Test—ASTM Test D97

Dissolution Time Test—Measure time required for 50 g of a surfactant to dissolve in one liter (L) of water at 20° C. with stirring using an overhead stirrer operating at a stirring rate of 500 revolutions per minute (rpm).

Subject surfactants from Comp Ex A-E, Ex 1-2, two commercial surfactants (Comp Ex F=TERGITOL™ NP-9, commercially available from The Dow Chemical Company; Comp Ex G=NEODOL™ 25-7, commercially available from Shell Chemicals) and an experimental surfactant (Comp Ex H) that has the same composition as Comp Ex A save for reversing order of propoxylation and ethoxylation to Draves Wetting Testing, Surface Tension Testing, Critical Micelle Concentration Testing and Ross Miles Foam Height Testing (Initial and Final (after five minutes)) and summarize test results in Table 3 below. For reference purposes, deionized water has a surface tension of 73 dynes/cm. In addition, subject surfactants from Comp Ex A-G and Ex 1-2 to Pour Point Testing, Dissolution Time Testing and Gel Range Testing and summarize test results in Table 4 below where, for Gel Range Testing, L=liquid, G=gel and S=solid.

TABLE 3

| | Wetting Times, Sec (Draves) | | | 20 Sec Wetting Conc. Wt % | CMC (ppm) | Surface Tension Surface Tension at 0.1 Wt. % | Ross Miles Foam | |
|---|---|---|---|---|---|---|---|---|
| Example | 0.05% | 0.10% | 0.15% | | | | Initial (mm) | Final (mm) |
| Ex. 1 | 29.5 | 10.5 | 5 | 0.06 | 11 | 30 | 110 | 25 |
| Ex. 2 | 40 | 11 | 5.5 | 0.09 | 18 | 29 | 120 | 10 |
| Comp. Ex. A | 38 | 7.5 | 3.5 | 0.07 | 190 | 29 | 109 | 22 |
| Comp. Ex. B | 38 | 17 | 10 | 0.09 | 11 | 30 | 105 | 20 |
| Comp. Ex. C | 48 | 10 | 4.5 | 0.07 | 115 | 29 | 105 | 15 |
| Comp. Ex D | 36 | 18 | 10 | 0.09 | 16 | 31 | 105 | 50 |
| Comp. Ex. E | 38 | 10 | 7 | 0.07 | 33 | 29 | 115 | 40 |
| Comp. Ex. F | 34 | 12 | 6 | 0.07 | 20 | 30 | 148 | 35 |
| Comp Ex. G | 63 | 22 | 13 | 0.11 | 11 | 28 | 105 | 100 |
| Comp. Ex. H | 137 | 10 | 5 | 0.09 | 530 | 30 | 60 | 5 |

The data in Table 3 demonstrate that order of alkoxylation is important, at least in terms of Draves Wetting Times for a 0.05 wt % concentration of surfactant, CMC and Ross Miles Foam Height Testing results as shown by comparing Comp Ex A (propoxylation followed by ethoxylation) and Comp Ex H (ethoxylation followed by propoxylation). The data in Table 3 also demonstrate that seed-oil based surfactants of the present invention perform well in Draves and Ross Miles Foam testing and have a desirable CMC. As shown in Table 4 below, such surfactants also have a low Gel Range.

TABLE 4

| Example | Pour Point, °C. | Dissolution Time (Min:sec) | Gel Range, Percent Surfactant in Water at 23 C. | | | | | | | | | |
|---|---|---|---|---|---|---|---|---|---|---|---|---|
| | | | 10% | 20% | 30% | 40% | 50% | 60% | 70% | 80% | 90% | 100% |
| Ex. 1 | −3 | 0:30 | L | L | L | L | L | L | L | L | L | L |
| Ex. 2 | 6 | 0:20 | L | L | L | L | L | L | L | L | L | L |
| Comp. Ex. A | 3.5 | 0:05 | L | L | L | L | L | L | L | L | L | L |
| Comp. Ex. B | 14.5 | 20.00 | L | L | L | G | G | G | G | G | L | L |
| Comp. Ex C | 6 | 0:06 | L | L | L | L | L | L | L | L | L | L |
| Comp. Ex. D | 16 | 20:00 | L | L | L | G | G | G | G | G | L | L |
| Comp. Ex. E | 4 | 0:50 | L | L | L | L | G | L | L | L | L | L |
| Comp. Ex. F | −1 | 8:32 | L | L | L | L | L | G | G | G | L | L |
| Comp Ex. G | 26 | 16:00 | L | L | L | G | G | G | G | L | L | S |

L = Liquid, G = Gel, S = Solid

The data in Table 4 demonstrate that seed-oil based surfactants of the present invention with an R group distribution as specified above have a combination of a narrow gel range (less than 20% of the range from 0% to 100% dilution), coupled with a rapid dissolution time (less than 2 minutes) and a low pour point (less than 10° C.). Surfactants that lack a $C_8$-$C_{10}$ fraction, such as Comp Ex B and Comp Ex D tend to have an unacceptably broad gel range, an excessively long dissolution time, and an unacceptably high pour point.

Ex 4

Detergent Performance Properties of Surfactant Blends

Perform laundry testing using a Terg-O-Meter with test conditions as follows: agitation rate=100 cycles/minute; wash temperature=40° C.; wash bath size=1 L; polyester/cotton swatches 3-in. by 3-in. (7.5-cm by 7.5-cm) square, with pinked edges, using Sebum/Pigment (STC EMPA 119) from Testfabrics™. Wash the fabric swatches, using de-ionized water with 300 ppm surfactant. Measure the delta reflectance using a Hunter Colorimeter in the "reflectance" mode. Summarize test results in Table 5 below. In addition to using surfactants from Comp Ex A-E and Ex 1-2, and commercial surfactants (Comp Ex F and Comp Ex G), Comp Ex I represents a control with only deionized water.

TABLE 5

| Example | Delta Reflectance (Terg-o-meter) |
|---|---|
| Ex 1 | 6.314 |
| Ex 2 | 9.386 |
| Comp Ex A | 1.202 |
| Comp Ex B | 10.482 |
| Comp Ex C | 3.016 |
| Comp Ex D | 11.446 |
| Comp Ex E | 9.336 |
| Comp Ex F | 11.988 |
| Comp Ex G | 11.496 |
| Comp Ex I | 0.734 |

The data in Table 5 show that certain surfactants perform better than others from a laundry detergency point of view. Surfactants based on C8-C10 alcohols (Comp Ex A, Comp. Ex. C) show poor detergent performance (where "poor" is defined as <5 delta reflectance units, as shown in Table 5) but excellent dissolution times, pour points, and gel ranges (as shown in Table 4). Surfactants based on C12+ alcohols (Comp. Ex. F, Comp. Ex. G, Comp. Ex. B, Comp. Ex. D) show good laundry performance (where "good" is defined as >9 delta reflectance units as shown in Table 5) but poor dissolution times and gel ranges (as shown in Table 4). Only those surfactants based on critical C8-C10 and C12-C14 blends (Comp Ex E, a petroleum-based surfactant and Ex. 2, a seed oil-based surfactant) show both moderate to good laundry performance (where moderate to good is defined as >5 delta reflectance units) and excellent dissolution times, pour points, and gel ranges.

We claim:

1. A surfactant composition comprising at least one nonionic surfactant represented by formula (I)

$$R\text{—}O\text{—}(C_3H_6O)_x(C_2H_4O)_y\text{—}H \qquad (I)$$

wherein x is a real number within a range of from 0.5 to less than 4, y is a real number within a range of from 2 to 10, and R is a mixture of seed-oil based linear alkyl moieties with an alkyl moiety distribution as follows wherein each wt % is based upon weight of all alkyl moieties present in the distribution and all wt % for each distribution total 100 wt %:

| Carbon Atoms in Alkyl Moiety | Amount |
|---|---|
| $C_6$ | 0 wt %-40 wt % |
| $C_8$ | 20 wt %-40 wt % |
| $C_{10}$ | 20 wt %-45 wt % |
| $C_{12}$ | 10 wt %-45 wt % |
| $C_{14}$ | 0 wt %-40 wt % |
| $C_{16}$-$C_{18}$ | 0 wt %-15 wt % |

2. The composition of claim 1 wherein x is a real number less than or equal to 3.

3. The composition of claim 1, wherein x is a real number within a range of from 2-3.

4. The composition of claim 1, wherein x is less than y.

5. The composition of claim 1, wherein y is greater than or equal to 2 times x.

6. The composition of claim 1, wherein x is from 2.5 to 3, and the alkyl moiety is as follows:

| Carbon Atoms in Alkyl Moiety | Amount |
|---|---|
| $C_6$ | 0-36% |
| $C_8$ | 22-40% |
| $C_{10}$ | 27-44% |
| $C_{12}$ | 14-35% |
| $C_{14}$ | 5-13% |
| $C_{16}$-$C_{18}$ | 0-5% |

7. The composition of claim 1, whereby the composition has a pour point of less than 15° C.

8. The composition of claim 1, whereby the composition has a critical micelle concentration in de-ionized water of less than about 200 ppm.

9. The composition of claim 1, wherein a 0.05 wt. % solution of the composition in deionized water has a wetting time of less than about 50 seconds.

10. The composition of claim 1, wherein a 0.1% solution of the composition in de-ionized water has a surface tension of less than 31 dynes/cm.

11. The composition of claim 1, wherein the composition has a gel range of less than 20%.

12. A detergent or cleaner, comprising the composition of claim 1 in an amount within a range of from 1 weight percent to 99.1 weight percent, in each case based on total weight of the detergent or cleaner.

13. The detergent or cleaner of claim 12, further comprising an additive and de-ionized water.

* * * * *